United States Patent [19]
Butschkau

[11] 3,864,173
[45] Feb. 4, 1975

[54] ELECTRIC BATTERY PROVIDED WITH A SAFEGUARD AGAINST SHORT-CIRCUITINGS

[76] Inventor: Hans Butschkau, Franz-Lenze-Platz 37a, 4103 Walsum, Germany

[22] Filed: Apr. 18, 1973

[21] Appl. No.: 352,307

[52] U.S. Cl. .............................. 136/181, 335/206
[51] Int. Cl. ............................................ H01m 31/00
[58] Field of Search ............. 136/181; 335/206, 207

[56] References Cited
UNITED STATES PATENTS

| | | | |
|---|---|---|---|
| 1,449,370 | 3/1923 | Apple | 136/181 |
| 1,924,959 | 8/1933 | Patterson | 136/181 |
| 2,335,526 | 11/1943 | Mitchell | 136/181 |
| 3,506,939 | 4/1970 | Hesser et al. | 335/207 |

Primary Examiner—Winston A. Douglas
Assistant Examiner—H. A. Feeley
Attorney, Agent, or Firm—Holman & Stern

[57] ABSTRACT

A short-circuitry protection arrangement for an electric battery is disclosed wherein the battery is housed within a housing containing a magnetically switchable switch. The inner housing is insertable into an outer housing which contains a magnet. When the inner housing is inserted into the outer housing the magnet becomes operatively associated with the magnetic switch so that then and then only can power be drawn from the battery.

8 Claims, 2 Drawing Figures

ELECTRIC BATTERY PROVIDED WITH A SAFEGUARD AGAINST SHORT-CIRCUITINGS

BACKGROUND OF THE INVENTION

The instant invention concerns an electric battery which is provided with a safeguard means against short-circuiting. Batteries of this type are needed especially in industrial areas where danger of explosion exists.

SUMMARY OF THE INVENTION

It is the object of the instant invention to provide a battery which is protected under all circumstances and in every respect against short-circuiting. The term battery is herein understood to include electric accumulators as well as electric elements.

In accordance with the instant invention, the problem is solved in that the battery is arranged in an inner housing in which is located a switch which is only magnetically switchable and is located in the electrical circuitry of the battery; and whereby an outer housing is provided into which the inner housing can be inserted and in which a magnet is arranged at a point so as to be located closely to the point at which the switch is placed, when the housings are placed inside each other.

In a preferred embodiment of the instant invention, one pole of the battery is connected by means of the magnetic switch with a contact which is disposed in the inner housing, whereby a counter-contact is similarly provided in the outer housing, and whereby contact and counter-contact are arranged in such a way that they communicate during the movement of inserting the inner housing into the outer housing, before the switch is moved into the area of the magnetic field of the magnet arranged thereto. Such a magnetic switch may be provided in the power circuit of each pole of the battery; hence two magnets are then arranged in the outer housing.

In the electrical circuit including each pole of the battery, two magnetic switches may be connected in series and two magnets may accordingly be arranged in the outer housing. The contacts mentioned above for connecting the electrical circuit of the inner housing with the electrical circuit of the outer housing may consist of contact bars and of tongues which are insertable therein, and which are placed in the direction in which the houses are inserted into each other.

An indicator means for indicating the operable condition of the battery may be arranged in the inner housing between the contacts, such as, for example, a photodiode, while the outer housing is provided with a window which corresponds with the indicator means. In order to be able to switch off the battery after the housings are placed into each other, a soft-iron plate may be provided which is insertable between the magnetic switch and the magnets arranged thereto.

The inner housing consists preferably of a single cell into which are integrally cast all parts contained therein.

As long as a battery is not inserted into the outer housing, its electrical circuit remains open. It is therefore unable to unload and short-circuiting is entirely impossible.

Instruments which utilize such batteries may already be provided with a built-in outer housing of the above-mentioned type. In any case, no unloading spark can develop when the old battery is replaced with a new one. The exchange is very simple: the battery is inserted with the entire inner housing into the outer housing. The contacts first communicate with the counter-contacts, while the magnetic switch remains in the OFF position. It is only when the inner housing is completely placed inside the outer housing that the magnets are so tightly adjacent the switches which are arranged thereto, that the switches are then turned to the ON position. Accordingly, during removal of the inner housing from the outer housing, the switches are in the OFF position, and only then is the connection of contacts and counter-contact opened.

BRIEF DESCRIPTION OF THE DRAWINGS

The invention will be better understood when described with reference to the drawings wherein.

DETAILED DESCRIPTION OF A PREFERRED EMBODIMENT

Figure 1:
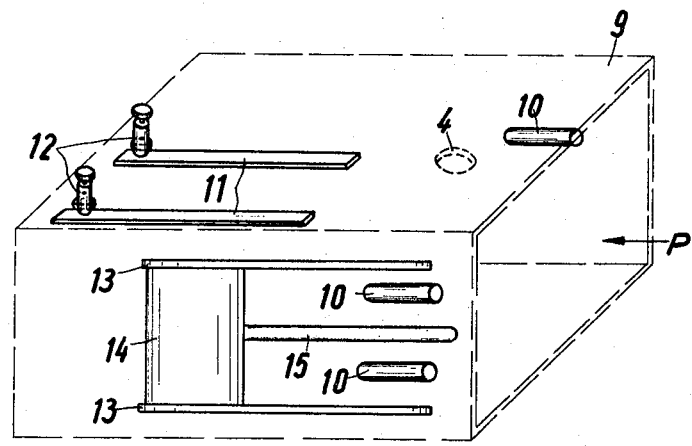
FIG. 1 illustrates the outer housing.
Figure 2:
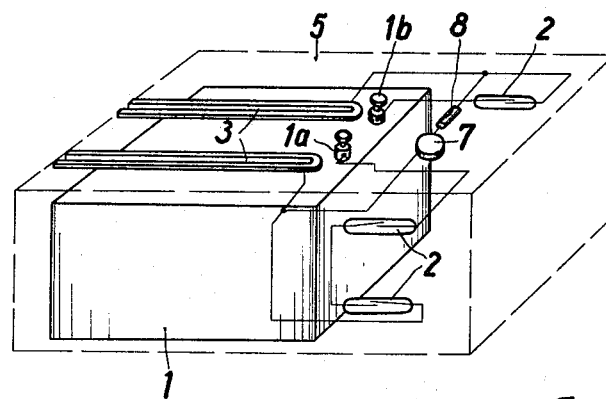
FIG. 2 shows the inner housing of the device according to the instant invention.

The inner housing forms a cell 5 by integrally casting therein with synthetic fibers: one electrical battery 1, three switches 2 which are only magnetically switchable; one photodiode 7, and its adherent pre-resistor 8, and two bars 3, in such a manner that they do not extend beyond the upper part of the cell 5. The terminal connector 1a of the battery 1 is connected by means of two consecutively arranged switches, and only magnetically switchable switches 2 to the one contact bar 3, while the other terminal connector 1b is connected with the other contact bar 3 by means of switch 2 which is only magnetically switchable. The contact bars 3 are connected to each other by means of photodiodes 7 and their pre-resistor 8.

Three rod-shaped permanent-magnets 10 are arranged in the outer housing at such points so that after the inner housing 5 is inserted into the outer housing 9, they are positioned closely adjacent the switches 2. Immediately below the upper part of the housing 9 are afixed the contact tongues 11 which carry at their ends the contact terminal connectors 12 which protrude upwardly from housing 9. In the upper part of housing 9 is disposed a window 4 which corresponds with the photodiode 7.

On the front wall of the outer housing 8, two bars 13 are disposed which are placed parallel to each other and which serve for guiding the soft-iron plate 14, which may be moved by means of a handle 15 between the magnets 10 and the respective switches.

The outer housing 9 may form a structural part of the device, which is to be operated by the battery. The inner housing 5, together with the battery and the switches 2, are placed in the outer housing in the direction of the arrow P. The tongues 11 of the housing 9 slide into the contact bars 3 of the housing 5. As soon as the inner housing 5 is pushed completely into the outer housing, the magnets 10 are immediately adjacent the switches 2, therefore, the switches 2 are only closed after the inner housing 5 is completely pushed into the outer housing 9. The photodiode 7 then indicates that the battery is switched on and voltages may be taken at the terminals 12 of the outer housing 9. The battery which is pushed into the outer housing 9 can thereby be switched off when the plate 14 is inserted between the magnets 10 and the respective switches 2.

The housing 9 may be provided with a cover lid which contains a permanent magnet in accordance with a switch in the inner housing 5. During the opening of the cover lid, the battery 1 is switched on.

What is claimed is:

1. A short-circuiting protection arrangement for an electrical battery, comprising, in combination:
    a. an electrical battery;
    b. inner housing means for housing the battery;
    c. a normally-open magnetically switchable switch arranged in the inner housing means and electrically connectable to the battery;
    d. outer housing means for housing the inner housing means, the inner housing means being insertable into the outer housing means;
    e. a magnet having an associated magnetic field and arranged on the outer housing means for being operatively associated with the switch and closing same when the inner housing means is inserted into the outer housing means;
    f. terminals mounted on the outer housing means; and
    g. contact means provided on the inner housing means and outer housing means for connecting the switch to the terminals when the inner housing means is inserted into the outer housing means.

2. The protection arrangement as claimed in claim 1 wherein the contact means has two contactable bars provided in said inner housing means and two tongues mateable with the bars provided in said outer housing means, said contact means being so arranged in the respective housing means, that when said inner housing means in inserted into said outer housing means, the arms and tongues come into contact with each other before said magnetically switchable switch enters the magnetic field of said magnet.

3. The protection arrangement as claimed in claim 2 wherein said magnetically switchable switch is connected between one pole of the battery, and one contactable bar of said first contact means and further including at least another magnetically switchable switch connected between the other pole of said battery and the other contactable bar of said contact means.

4. The protection arrangement as claimed in claim 2 wherein two magnetically switchable switches are connected between one pole of said battery and one arm of said contact means and two magnets are disposed in said outer housing means so that said two magnetically switchable switches are operatively associated with said two magnets when said inner housing means is inserted into said outer housing means.

5. The protection arrangement as claimed in claim 4 wherein said two contactable bars of said contact means are slidable in said two contact tongues upon insertion of said inner housing means into said outer housing means.

6. The protection arrangement as claimed in claim 5 wherein an indicator means is connected across the two contactable bars of said first contact means for indicating the operable condition of said battery and an associated window is provided in said second housing means for viewing said indicator means.

7. The protection arrangement as claimed in claim 6 wherein a soft iron plate means is insertable between said at least one magnetically switchable switch and said at least one magnet for cutting off the operable association therebetween.

8. The protection arrangement as claimed in claim 7 wherein said inner housing means has said battery, said magnetically switchable switches, said contactable bars and said indicator means integrally cast therein.

* * * * *

UNITED STATES PATENT OFFICE
CERTIFICATE OF CORRECTION

PATENT NO. : 3,864,173
DATED : February 4, 1975
INVENTOR(S) : Hans Butschkau

It is certified that error appears in the above-identified patent and that said Letters Patent are hereby corrected as shown below:

[30] Foreign Priority Document:

West Germany P2220410.0 April 26, 1972

Signed and Sealed this twenty-second Day of July 1975

[SEAL]

Attest:

RUTH C. MASON
Attesting Officer

C. MARSHALL DANN
Commissioner of Patents and Trademarks